United States Patent
Takizawa et al.

(10) Patent No.: US 10,903,769 B2
(45) Date of Patent: Jan. 26, 2021

(54) ROTARY ELECTRICAL MACHINE CONTROL DEVICE, ROTARY ELECTRICAL MACHINE, AND ROTARY ELECTRICAL MACHINE CONTROL METHOD

(71) Applicant: Mitsubishi Electric Corporation, Tokyo (JP)

(72) Inventors: Yuji Takizawa, Tokyo (JP); Yu Hirotani, Tokyo (JP); Masafumi Okazaki, Tokyo (JP); Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/474,677

(22) PCT Filed: Feb. 16, 2017

(86) PCT No.: PCT/JP2017/005692
§ 371 (c)(1),
(2) Date: Jun. 28, 2019

(87) PCT Pub. No.: WO2018/150511
PCT Pub. Date: Aug. 23, 2018

(65) Prior Publication Data
US 2019/0363659 A1    Nov. 28, 2019

(51) Int. Cl.
*H02P 6/12* (2006.01)
*H02P 21/22* (2016.01)
(Continued)

(52) U.S. Cl.
CPC .............. *H02P 21/22* (2016.02); *H02K 1/223* (2013.01); *H02K 3/47* (2013.01); *H02P 25/098* (2016.02)

(58) Field of Classification Search
CPC ........ H02P 21/22; H02P 25/098; H02K 1/223
See application file for complete search history.

(56) References Cited

U.S. PATENT DOCUMENTS

| | | | |
|---|---|---|---|
| 7,176,598 B2* | 2/2007 | Mori | ............... H02K 1/276 310/156.57 |
| 2009/0146589 A1 | 6/2009 | Hattori et al. | |

(Continued)

FOREIGN PATENT DOCUMENTS

| | | |
|---|---|---|
| EP | 2 991 204 A1 | 3/2016 |
| JP | 2008-017660 A | 1/2008 |

(Continued)

OTHER PUBLICATIONS

International Search Report for PCT/JP2017/005692 dated Apr. 25, 2017 [PCT/ISA/210].

(Continued)

*Primary Examiner* — Karen Masih
(74) *Attorney, Agent, or Firm* — Sughrue Mion, PLLC; Richard C. Turner

(57) ABSTRACT

Provided is a rotary electrical machine, which is reduced in size of a motor through use of reluctance torque being a feature of an IPM motor, and in which, in driving in times other than a rated time, a current phase angle is shifted from an angle at which a total torque is maximized so that an increase in torque ripple is suppressed even when the current phase angle changes, to thereby provide characteristics of small size, high output, and low torque ripple.

10 Claims, 5 Drawing Sheets

(51) Int. Cl.
*H02P 25/098* (2016.01)
*H02K 1/22* (2006.01)
*H02K 3/47* (2006.01)

(56) References Cited

U.S. PATENT DOCUMENTS

2010/0013342 A1 1/2010 Xu et al.
2011/0057591 A1 3/2011 Tagome et al.

FOREIGN PATENT DOCUMENTS

| JP | 2009-195049 A | 8/2009 |
| JP | 2009-254100 A | 10/2009 |
| JP | 2012-125078 A | 6/2012 |
| JP | 2015-213407 A | 11/2015 |
| JP | 6015350 B2 | 10/2016 |

OTHER PUBLICATIONS

The Extended European Search Report dated Jan. 31, 2020, issued by the European Patent Office in application No. 17896589.3.

\* cited by examiner

ROTARY ELECTRICAL MACHINE CONTROL DEVICE, ROTARY ELECTRICAL MACHINE, AND ROTARY ELECTRICAL MACHINE CONTROL METHOD

CROSS REFERENCE TO RELATED APPLICATIONS

This application is a National Stage of International Application No. PCT/JP2017/005692 filed Feb. 16, 2017.

TECHNICAL FIELD

The present invention relates to a device for controlling a rotary electrical machine having characteristics of small in size, high output, and low torque ripple, a rotary electrical machine, and a method of controlling a rotary electrical machine.

BACKGROUND ART

As a related art relating to a rotary electrical machine, there has been given an Interior Permanent Magnet (IPM) motor having permanent magnets embedded in a rotor core (see, for example, Patent Literature 1). In this Patent Literature 1, the IPM motor can be driven by energizing the motor so as to use reluctance torque so that a total torque of magnet torque and the reluctance torque is maximized. As a result, a motor with a reduced amount of the magnets is achieved.

CITATION LIST

Patent Literature

[PTL 1] JP 6015350 B2

SUMMARY OF INVENTION

Technical Problem

However, the related art has the following problem.

In Patent Literature 1, the motor is driven by changing a current phase angle so that the total torque to be generated during from low current driving having low energization current to a rated time is maximized.

In such a case, generally, phases of a higher harmonic wave of magnetomotive force in a stator and a higher harmonic wave of magnetomotive force in a rotor, which cause torque ripple changes largely in association with the current phase angle. For that reason, in the related-art motor as described in Patent Literature 1, there may cause such a driving state that the torque ripple increases during from the low current driving to the rated driving.

As a result, even when a small-sized motor can be designed by changing the current phase angle so as to maximize the total torque, after all, an increase in torque ripple in association with the current phase angle becomes a constraint so that the realization of the motor with the larger torque cannot be made.

The present invention has been made to solve the above-mentioned problem, and it is an object of the present invention to provide a control device for a rotary electrical machine having characteristics of high output and low torque ripple, in addition to reduce a size of a motor through use of reluctance torque being a feature of an IPM motor, a rotary electrical machine, and a method of controlling a rotary electrical machine.

Solution to Problem

According to one embodiment of the present invention, there is provided a control device for a rotary electrical machine, comprising: a rotary electrical machine including an armature and a rotor; and a controller configured to drive and control the rotary electrical machine; wherein the armature includes an armature core including: a plurality of magnetic teeth; and an armature winding formed of a multi-phase winding group, which is wound around the teeth 7, and is received in a slot between the teeth, wherein the rotor includes a rotor core having a permanent magnet embedded therein, is arranged through magnetic air gap defined between the rotor and the armature, and is provided so to be rotatable about a rotation axis, and wherein, below a number of revolutions at which field-weakening current for canceling counter-electromotive force is increased, the controller is configured to drive and control the rotary electrical machine at a current phase angle $\theta$, which is different from a current phase angle $\theta 1$ at which torque is maximized in constant energization current.

Further, according to one embodiment of the present invention, there is provided a rotary electrical machine to be driven and controlled by the controller of the control device for a rotary electrical machine, wherein each of the armature and the rotor has such a configuration that, in the rated time, a current phase angle at which torque is maximized and a current phase angle at which torque ripple is minimized conform to each other.

Still further, according to one embodiment of the present invention, there is provided a method of controlling a rotary electrical machine to be driven and controlled by the controller of the control device for the rotary electrical machine, wherein, below a number of revolutions at which field-weakening current for canceling counter-electromotive force is increased, the controller is configured to drive and control the rotary electrical machine at a current phase angle $\theta$, which is different from a current phase angle $\theta 1$ at which torque is maximized in constant energization current.

Advantageous Effects of Invention

According to the present invention, the rotary electrical machine has a configuration such that, through use of the reluctance torque being the feature of the IPM motor, the size of the motor is reduced, and the current phase angle is shifted from the angle at which the total torque is maximized in driving other than the rated time so that the increase in torque ripple can be suppressed even when the phase angle changes. As a result, it is possible to obtain the control device for the rotary electrical machine w having the characteristics of high output and low torque ripple, in addition to reduce the size of the motor, through use of the reluctance torque being the feature of the IPM motor, the rotary electrical machine, and the method of controlling the rotary electrical machine.

DESCRIPTION OF EMBODIMENTS

Figure 1:
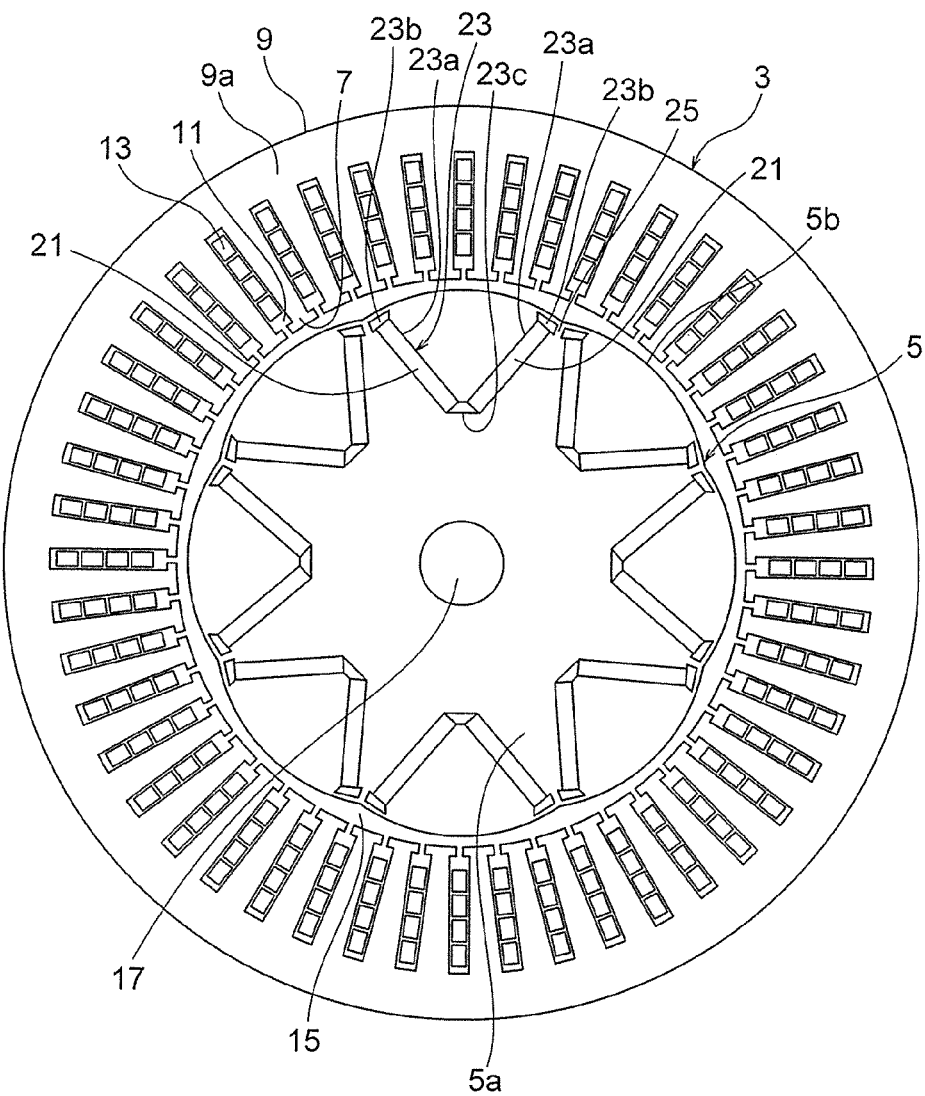
FIG. 1 is a horizontal sectional view of a V-shaped IPM motor according to a first embodiment of the present invention.

Now, preferred embodiments of a control device for a rotary electrical machine, a rotary electrical machine, and a method of controlling a rotary electrical machine according to the present invention are described with reference to the accompanying drawings. Note that, in the drawings, the same reference symbols represent the same or corresponding parts.

First Embodiment

In a first embodiment, description is made of a rotary electrical machine, as an example, which is a multi-layer multi-phase winding permanent magnet motor. More specifically, detailed description is directed to a multi-layer multi-phase winding AC rotary electrical machine, which includes armature windings having multi-layer and multi-phase configurations, and in which each of the windings is configured to use a magnetic path in common at a gap at which a field pole and an armature are opposed to each other.

Note that, the multi-layer multi-phase winding permanent magnet motor can be applied to an electric power steering device as one example.

FIG. 1 is a horizontal sectional view of a V-shaped IPM motor according to the first embodiment of the present invention. The horizontal sectional view corresponds to a cross section perpendicular to a direction of a rotation shaft 17 of the motor to be described later.

The multi-layer multi-phase winding permanent magnet motor being a rotary electric machine as described in the first embodiment includes an armature 3 and a rotor 5. The armature 3 includes an armature core 9 and armature windings 13. The armature core 9 includes a plurality of magnetic teeth 7. The armature windings 13 are formed of multi-layer multi-phase winding groups, are wound around the teeth 7, and are accommodated in slots 11 between the teeth 7.

In FIG. 1 corresponding to a plane in which a rotation center is defined as a perpendicular line, a hole having substantially a circular shape is formed at a center of the armature core 9. The rotor 5 is arranged in this hole. Distal ends of the plurality of teeth 7 are located on one circumference.

That is, the rotor 5 is arranged on an inner side of an armature 3 in a circumferential direction through a magnetic air gap 15 defined between the rotor 5 and the armature 3, and is provided so as to be rotatable about the rotation shaft 17. In the first embodiment, an area in which the magnetic air gap 15 is formed corresponds to a portion of the hole at which the rotor 5 is not arranged and is a hollow space.

Permanent magnets 21 are embedded in the rotor 5. Although detailed description is made later, a rotor core 5a has a step-skew structure with two or more stages, and those stages are arrayed in a rotation shaft direction (direction in which the rotation shaft extends, that is, direction in which the rotation center extends). Further, magnets having different polarities in different stages are arranged so as to be prevented from being overlapped with each other in the circumferential direction when viewed along the rotation shaft direction.

Now, the above-mentioned configuration is described in more detail. The armature 3 includes a first armature winding, a second armature winding, and the armature core 9. The armature core 9 includes an annular core back 9a and the teeth 7. The annular core back 9a is formed of a magnetic material such as a magnetic steel sheet. The teeth 7 extend from the core back 9a to the inner side in the circumferential direction. Although not illustrated, for example, insulating paper is inserted between the armature windings and the armature core 9 to secure electrical insulation.

As one example, the armature core 9 in the first embodiment is illustrated in FIG. 1 is formed to have forty-eight teeth 7 in total. Consequently, the number of slots 11 is also forty-eight. Further, in the example of FIG. 1, four coils of the armature winding are received in one slot 11.

The first armature winding is formed of three phases of a U1 phase, a V1 phase, and a W1 phase, and the second armature winding is formed of three phases of a U2 phase, a V2 phase, and a W2 phase. The armature windings are arranged in the order of the U1, U2, W1, W2, V1, and V2 phases from the first slot. The armature windings are arranged in the seventh and subsequent slots also in the order of the U1, U2, W1, W2, V1, and V2 phases, and are arranged in the same order to the forty-eighth slot.

However, for example, the armature windings are arranged so that directions of currents of the U1 phase in the first slot and the U1 phase in the seventh slot are reverse to each other. That is, the armature winding has a configuration of a distributed winding, which is wound from the first slot to the seventh slot, and the armature winding covers six teeth in total. This type of the distributed winding corresponds to an electrical angle of 180°, and a short pitch winding factor is 1.

Further, the armature windings are driven at a phase difference, in which electrical angles are different from each other by 30°. Thus, the distributed winding factor becomes 1. As a result, the winding factor becomes 1. Therefore, there is obtained such an effect that a motor that is reduced in size and high in torque is obtained, and that the amount of the permanent magnets to be used is small as compared to a motor that is small in winding factor to achieve reduction in cost.

Two permanent magnets 21 are allocated for one pole, and the two permanent magnets 21 are arranged in a V shape in each magnetic pole. In the example as illustrated in FIG. 1, a total of sixteen permanent magnets 21 are embedded, and the rotor 5 having eight poles is described. The permanent magnets 21, as one example, anisotropic magnets may be used.

Eight magnet accommodating holes 23 are formed in the rotor core 5a. That is, one magnet accommodating hole 23 is allocated for one pole. X Each of the magnet accommodating holes 23 as illustrated in FIG. 1 includes a pair of rectangular portions 23a, a pair of flux barrier portions 23b, and one center portion 23c.

In the same pole, the pair of rectangular portions 23a extend so that an interval of portions thereof in the circumferential direction is reduced toward a radially inner side. Corresponding permanent magnets 21 are arranged in the pair of rectangular portions 23a, respectively. The one center portion 23c is located between end portions of the pair of rectangular portions 23a on the radially inner side.

Each of the pair of flux barrier portions 23b is located more on a radially outer side with respect to an end portion of a corresponding rectangular portion 23a on the radially outer side. That is, the flux barrier portions 23b are located between the end portions of the corresponding rectangular portions 23a on the radially outer side and an outer peripheral surface 5b of the rotor core 5a.

In FIG. 1, an outer shape of the rotor core 5a is a flower round shape partially having a radius smaller than a radius of the true circle from the rotation center. Through formation of the rotor core 5a into the flower round shape, the torque ripple can be reduced, thereby obtaining a motor that is small in torque ripple.

The rotor core 5a is formed by stacking thin sheet-like members formed of a plurality of magnetic materials, such as a plurality of magnetic steel sheets, in the rotation shaft direction.

The rotor core 5a, as in the first embodiment, has a two-step skew structure. In the two-step skew structure, stage portions of the rotor core, which have the same shape, are stacked in two stages in the rotation shaft direction. For example, when a two-step skew of a mechanical angle of around 3.75° is formed in the rotor core 5a, an electrical angle 12th-order component of a cogging torque ripple can be reduced. As a result, there is an advantage in that a motor that is small in clogging torque ripple is obtained to improve a steering feeling of a driver.

Magnetic pole portions of the rotor core 5a are connected to each other through a bridge 25. More specifically, the bridge 25 being a part of the rotor core 5a is present between the flux barrier portions 23b of adjacent magnetic poles. A leakage magnetic flux flows through the bridge 25 in the rotor core 5a. Then, a magnetic flux to flow originally from the magnetic pole of the rotor 5 to the armature 3 through an air gap to generate torque is reduced due to the leakage magnetic flux.

When a bridge width corresponding to a distance in the circumferential direction between the pair of adjacent flux barrier portions 23b is large, the leakage magnetic flux is increased, and the torque of the motor is reduced. Accordingly, a configuration having a large bridge width is not suited to a high output motor.

In contrast, when the bridge width is reduced, the leakage magnetic flux can be reduced, but, to reduce the bridge width, the level of difficulty of press working is increased, thereby degrading productivity.

In general, in the press working, a thickness in the vicinity of a punched portion is reduced due to shear droop caused during the press working unless a punching width as large as a thickness of the rotor core 5a is secured. When the thickness is reduced, the bridge cannot be sufficiently held to cause distortion. As a result, the shape of the bridge portion is not stabilized, and due to increase in torque ripple, there is an adverse effect in that the steering feeling of a driver is degraded.

For that reason, in the first embodiment, the bridge width is set as large as the thickness of the rotor core to achieve a configuration in which increase in output of the motor and reduction in torque ripple can be both achieved.

Figure 2:
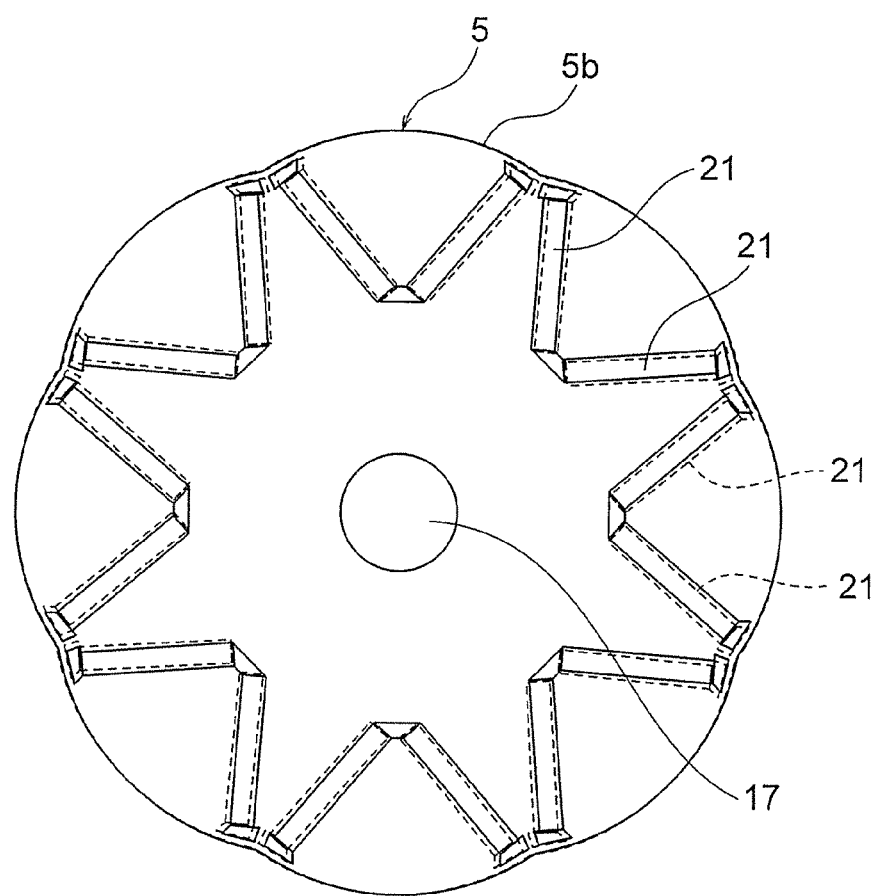
FIG. 2 is a perspective view of a rotor of the V-shaped IPM according to the first embodiment of the present invention when viewed from an axial direction.

Further, FIG. 2 is a perspective view of the rotor of the V-shaped IPM in the first embodiment of the present invention when viewed from an axial direction. The rotor, as illustrated in FIG. 2, has a configuration in which the permanent magnets 21 each having a different type of polarity are not overlapped between different stages.

That is, in FIG. 2, the permanent magnets 21 of a first pole each indicated by a solid line in a relatively upper stage are arranged so as to be prevented from being overlapped with the permanent magnets 21 of a second pole each indicated by the dotted line in a relatively lower stage in the circumferential direction when viewed along the rotation shaft direction.

Figure 3:
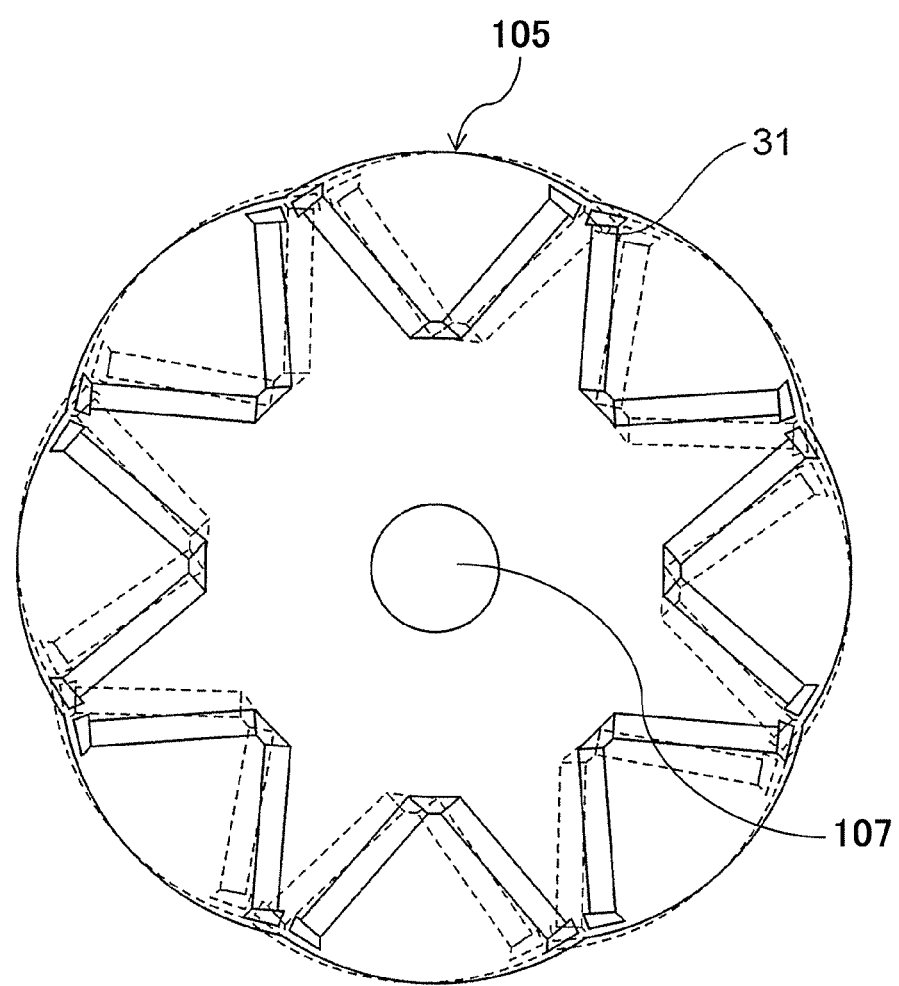
FIG. 3 is a perspective view of the rotor of the V-shaped IPM when viewed from the axial direction to be used for comparison to the arrangement of FIG. 2.

Meanwhile, FIG. 3 is a perspective view of a rotor of a V-shaped IPM for comparison to the arrangement of FIG. 2. In FIG. 3, a rotor 105 is illustrated as a comparative explanatory example. The rotor 105 has a configuration in which, to reduce the torque ripples, magnets having different polarities are overlapped to each other in different stages, and are set to have an angle to cancel the torque ripples to each other in each stage as illustrated in FIG. 3.

That is, in FIG. 3, when viewed along the direction of the rotation shaft 107, the permanent magnets having different polarities in different stages are overlapped to each other in the circumferential direction, with the result that an overlapped region 31 is formed.

In the permanent magnet motor of a two-layer three-phase winding, as in the first embodiment, energization phases of the first armature winding and the second armature winding are shifted by 30° to cancel six peaks of the torque ripples during one electrical angle cycle.

Consequently, it is not required to set a large step skew angle of a mechanical angle of around 7.5° (value obtained by dividing the electrical angle of 30° by the number of pole pairs of 4) so as to cancel the torque ripples. As a result, it is only required to set a small step skew angle of around 3.75° so as to reduce twelve peaks of the torque ripples, which are the second most important.

Thus, the mechanical angle between the step skew structures can be set to be a smaller value, and it is relatively easy to achieve a configuration in which magnets having different polarities in different stages are prevented from being overlapped to each other.

In the motor in the explanatory example as illustrated in FIG. 3, after a step skew angle is set to be around 7.5° of the mechanical angle, it is required to reduce the width of the magnetic pole so as not to have the overlapped region. As a result, the amount of the magnet is reduced, and the torque is reduced, which is not suited to the high output motor.

Figure 4:
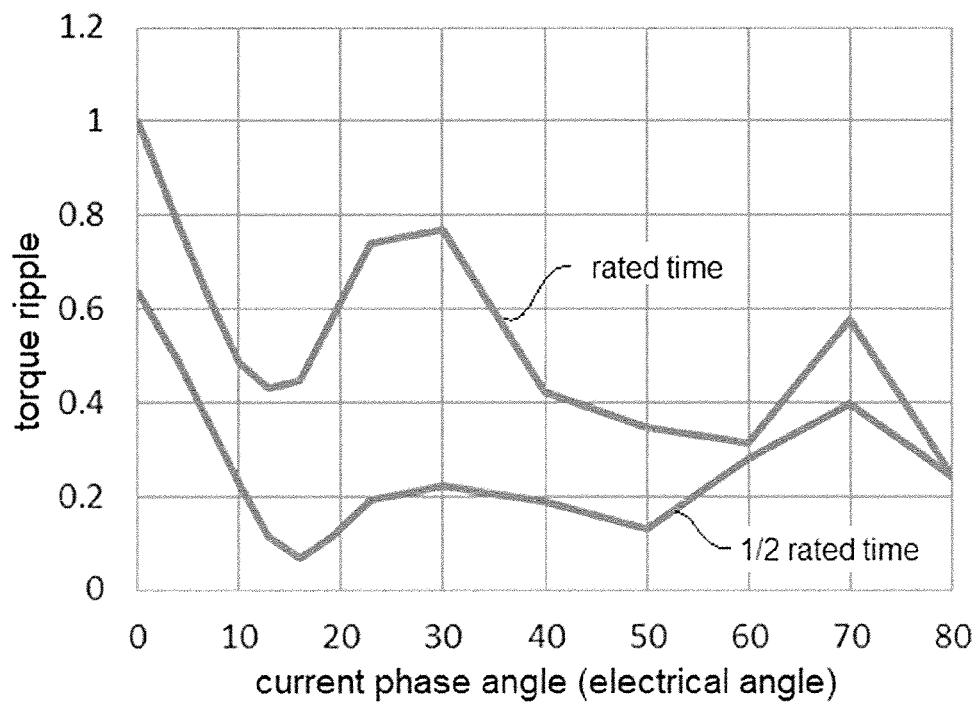
FIG. 4 is a graph for showing a relationship between measured torque ripple of 48th order component and current phase angles in a rated time and in a ½ rated time in the first embodiment of the present invention.

FIG. 4 is a graph for showing a relationship between measured torque ripple of 48th order component and current phase angles in a rated time and in a ½ rated time in the first embodiment of the present. That is, FIG. 4 shows change of the measured value of the torque ripple of the 48th order component in the rated time and in the ½ rated time when the current phase angle is changed in the range of from 0 degree to 80 degrees.

Note that, the ½ rated time means a case in which the energization current is a half of the rated value, and the rated time means a case in which the energization current is a rated value. Further, a torque ripple value is indicated by a value having a maximum value in the rated time as 1. As illustrated in FIG. 4, it can be seen that the torque ripple values are minimized when the current phase angle is around 13 degrees in both the ½ rated time and the rated time.

Figure 5:
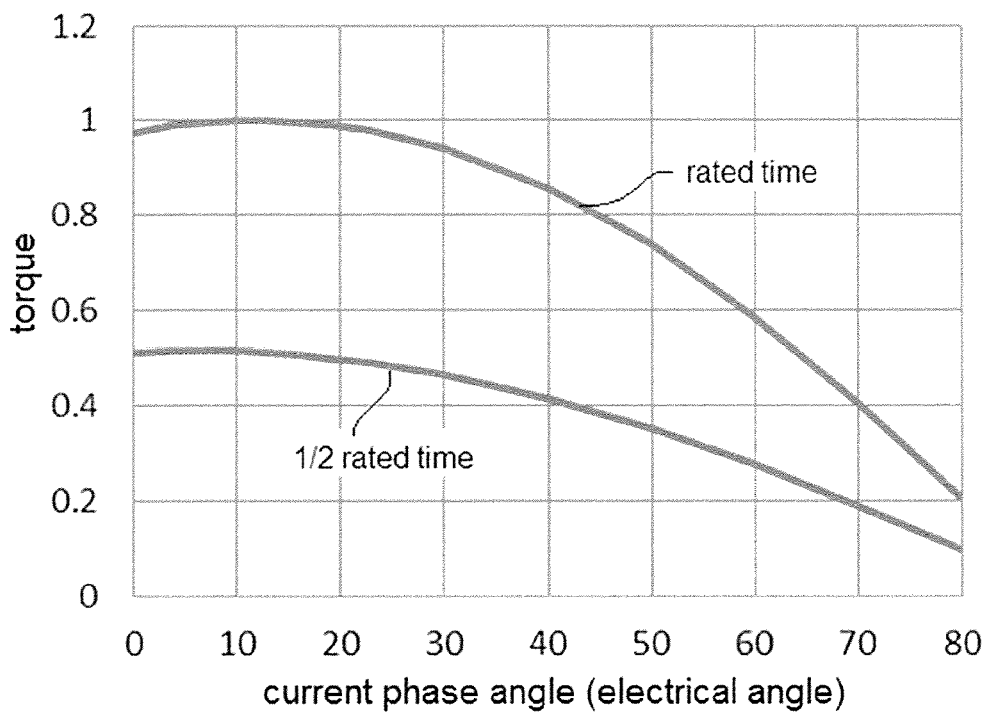
FIG. 5 is a graph for showing a relationship between measured torques and current phase angles in the rated time and in the ½ rated time in the first embodiment of the present invention.

Meanwhile, FIG. 5 is a graph for showing a relationship between measured torques and current phase angles in a rated time and in a ½ rated time in the first embodiment of the present. That is, FIG. 5 shows change of the measured values of the torque in the rated time and in the ½ rated time when the current phase angle is changed in the range of from 0 degree to 80 degrees.

Note that, the torque value is indicated by a value having a maximum value in the rated time as 1. For example, the maximum torque values are 0.5147 at the current phase angle of 7 degrees and 0.5054 at the current phase angle of 13 degrees in the ½ rated time, and is 1.000 at the current phase angle of 13 degrees in the rated time.

In the rated time, when the current phase angle is 13 degrees, the torque is maximum and the torque ripple is minimum. Contrary to this, at the ½ rated time, the torque ripple at the current phase angle of 7 degrees at which the torque is maximized is deteriorated as compared to the case where the torque ripple is 13 degrees. Then, for example, the current phase angle in the ½ rated time is set to 13 degrees so that it is possible to reduce the torque ripple more than the case where the current phase angle is set to 7 degrees.

The torque when the current phase angle is set to 13 degrees is lower than the case where the current phase angle is set be 7 degrees, but the decrease amount is only about 1.8%. Accordingly, it is possible to prevent torque reduction by only increasing a current value by about 1.8%.

Further, even when the current phase angle is set to 13 degrees, the torque is larger than a case where the current phase angle is set to 0 degree, and the use of the reluctance torque being the feature of IPM is not impaired.

That is, in the ½ rated time, by shifting the current phase angle from the current phase angle at which the torque is maximized, it is possible to achieve both downsizing of the motor and the reduction in torque ripple by using the IPM reluctance torque.

In other words, by designing the motor so as to conform the current phase angle at which the torque is maximized with the current phase angle at which the torque ripple is minimized in the rated time, the maximum torque of the motor can be achieved in the rated time. Meanwhile, in times other than the rated time, current flows at a current phase angle which minimizes the torque ripple. In this case, there is a margin in the energization current, and hence through increase of the current value by several percent, it is possible to suppress both the reduction in torque and the increase in torque ripple, thereby being capable of obtaining a remarkable effect which cannot be achieved by the related art.

The torque ripple is generated caused by a higher harmonic wave of magnetomotive force in a stator, a higher harmonic wave of magnetomotive force in a rotor, a slot higher harmonic wave in the stator, or the like. Consequently, it is difficult for a motor having high winding factors (winding factor=distributed winding factor×short-pitch winding factor) of the fundamental wave and the higher harmonic wave to achieve both high torque and low torque ripple.

For example, in an 8-pole 48-slot motor, the winding is a distributed winding so that the short-pitch winding factor is large, and, in an 8-pole 12-slot motor, the winding is concentrated winding so that the distributed winding factor is large. To cope with this, when IPM is applied irrespective of a distributed winding or a concentrated winding, through employment of the driving method according to the first embodiment, a motor having large torque and small torque ripple may be achieved.

Figure 6:
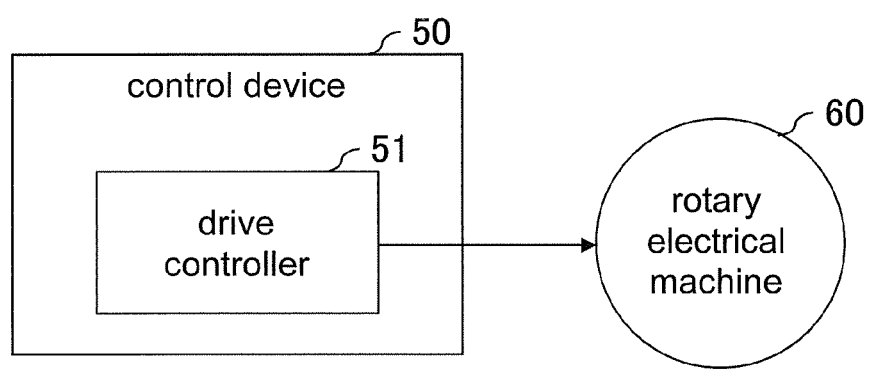
FIG. 6 is a block diagram of a control device for a rotary electrical machine according to the first embodiment of the present invention.

Next, description is made of a drive control method of the rotary electrical machine described above. FIG. 6 is a block diagram of a control device for a rotary electrical machine according to the first embodiment of the present invention. The rotary electrical machine described in the first embodiment is driven and controlled by a drive controller 50 illustrated in FIG. 6.

A rotary electrical machine 60 illustrated in FIG. 6 is configured to include the armature 3 and the rotor 5 described with reference to FIG. 1 and FIG. 2. That is, the armature 3 includes the armature core 9 including a plurality of magnetic teeth 7, and armature windings 13 formed of multi-layer winding groups which are wound around the teeth 7 and are received in slots 11 between the teeth 7.

Further, the rotor 5 includes a rotor core 5a having the permanent magnets 21 embedded therein, is arranged through the magnetic gap 15 and the armature 3, and is provided so as to be rotatable about the rotation shaft 17.

As described above, the rotary electrical machine 60 having such a configuration is designed such that a current phase angle at which torque is maximized conforms to a current phase angle at which torque ripple is minimized in a rated time. Then, the rotary electrical machine 60 is driven and controlled by the drive controller 50 as follows.

In the rated time, the drive controller 50 drives and controls at a current phase angle at which the maximum torque of the rotary electrical machine 60 is obtained to minimize torque ripple. In contrast, in times other than the rated time, the drive controller 50 energizes at a current phase angle at which torque ripple is minimized to drive and control the rotary electrical machine 60. When the drive controller 50 drives and controls in times other than the rated time, there is a margin in the energization current. Through perform of the drive control to increase a current value by several percent by the drive controller 50, it is possible to suppress both the reduction in torque and the increase in torque ripple.

More specifically, the drive controller 50 can drive and control the rotary electrical machine 60 at a current phase angle θ which is different from a current phase angle θ1 at which torque is maximized in constant energization current under a rotation speed at which field-weakening current for canceling counter-electromotive force is increased. As a result, it is possible to achieve drive control of the rotary electrical machine having characteristics of small in size, high output, and low torque ripple.

In other words, in times other than the rated time at which the energization current is at maximum, the drive controller 50 performs drive control by setting the current phase angle θ, which is different from the θ1 described above, to a value at which torque ripple can be further reduced.

As a result, there is no margin in the current in the rated time, and hence it is possible to minimize the size of the motor by energizing at a phase angle at which torque is maximum. Meanwhile, in times other than the rated time, there is a margin in the energization current, and hence it is possible to recover the torque by increasing the energization current even by energizing at a current phase angle at which torque ripple is minimum.

Note that, the drive controller 50 can control the current phase angle θ in the drive control time other than the rated time within a range in which torque is larger than the torque when the current phase angle is zero. As a result, the current phase angle is not zero, and the reluctance torque can be used in IPM.

Further, the drive controller 50 can set the current phase angle θ in the drive control time other than the rated time to a value larger than θ1 as described above with reference to FIG. 4 and FIG. 5.

The rotary electrical machine 60 to be subjected to control can employ a distributed winding. It is also possible to use the rotary electrical machine 60, in this case, having the same short-pitch winding factors of a fundamental wave and a higher harmonic wave.

Further, the rotary electrical machine 60 to be subjected to control can employ a concentrated winding. It is also possible to use the rotary electrical machine 60, in this case, having the same short-pitch winding factors of a fundamental wave and a higher harmonic wave.

As described above, according to the first embodiment, through use of the reluctance torque being a feature of the IPM motor, the size of the motor is reduced, and in the driving in times other than the rated time, the current phase angle is shifted from an angle at which the total torque is maximized. Therefore, it is possible to have a configuration in which increase in torque ripple can be suppressed even when the current phase angle changes.

As a result, while reducing the size of the motor through use of the reluctant torque being the feature of the IPM motor, there can be achieved the control device for the rotary electrical machine having characteristics of high output and low torque ripple, the rotary electrical machine, and the method of controlling the rotary electrical machine.

REFERENCE SIGNS LIST 3 armature, 5 rotor, 5a rotor core, 7 teeth, 9 armature core, 11 slot, 13 armature winding, 15 magnetic gap, 17 rotation shaft, 21 permanent magnet, 25 bridge, 50 drive controller, 60 rotary electrical machine

The invention claimed is:

1. A control device for a rotary electrical machine, comprising:
   a rotary electrical machine including an armature and a rotor; and
   a controller configured to drive and control the rotary electrical machine;
   wherein the armature includes an armature core including:
     a plurality of magnetic teeth; and an armature winding formed of a multi-phase winding group, which is wound around each of the plurality of magnetic teeth, and is received in a slot between each of the plurality of magnetic teeth,
   wherein the rotor includes a rotor core having a permanent magnet embedded therein, is arranged through magnetic air gap defined between the rotor and the armature, and is provided so to be rotatable about a rotation axis, and
   wherein the controller is configured to drive and control the rotary electrical machine at a current phase angle θ1 at which torque is maximized during a first period in which energization current is maximum, and to drive and control the rotary electrical machine at a current phase angle θ, which is different from the current phase angle θ1, during a second period other than the first period in which the energization current is less than maximum.

2. The control device for a rotary electrical machine according to claim 1,
   wherein a torque at the current phase angle θ is larger than a torque when the current phase angle is zero.

3. The control device for a rotary electrical machine according to claim 1,
   wherein the following relationship:

θ>θ1 is satisfied when the rotary electrical machine is driven and controlled.

4. A rotary electrical machine to be driven and controlled by the controller of the control device for a rotary electrical machine according to claim 1,
   wherein each of the armature and the rotor has such a configuration that, during the first period, the current phase angle θ1 at which torque is maximized and a current phase angle at which torque ripple is minimized are equal to each other.

5. The rotary electrical machine according to claim 4,
   wherein the electric rotating machine is a multi-layer multi-phase winding permanent magnet motor,
   wherein the rotor core has a step-skew structure with two or more stages, and
   wherein permanent magnets having different polarities in different stages are arranged so as to be prevented from being overlapped to each other when viewed along a rotation shaft direction.

6. The rotary electrical machine according to claim 4,
   wherein the armature has a first armature winding and a second armature winding as the multi-phase winding groups, and
   wherein an energizing phase of the second armature winding is configured to be shifted by 30 degrees from an energizing phase of the first armature winding.

7. The rotary electrical machine according to claim 4,
   wherein an outer shape of the rotor core is formed as a flower round shape partially having a radius smaller than a radius of the true circle from the rotation center.

8. The rotary electrical machine according to claim 4,
   wherein the multi-phase winding group is formed in distributed winding.

9. The rotary electrical machine according to claim 4,
   wherein the multi-phase winding group is formed in concentrated winding.

10. A method of controlling a rotary electrical machine to be driven and controlled by the controller of the control device for the rotary electrical machine according to claim 1.

* * * * *